United States Patent Office 3,623,370
Patented Nov. 30, 1971

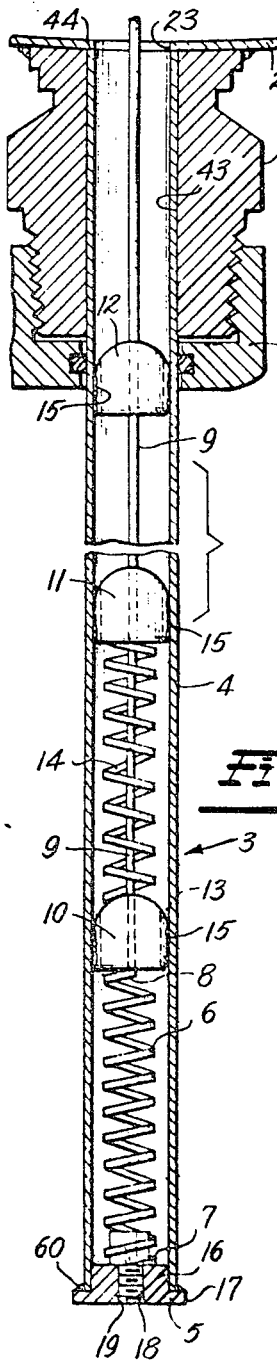

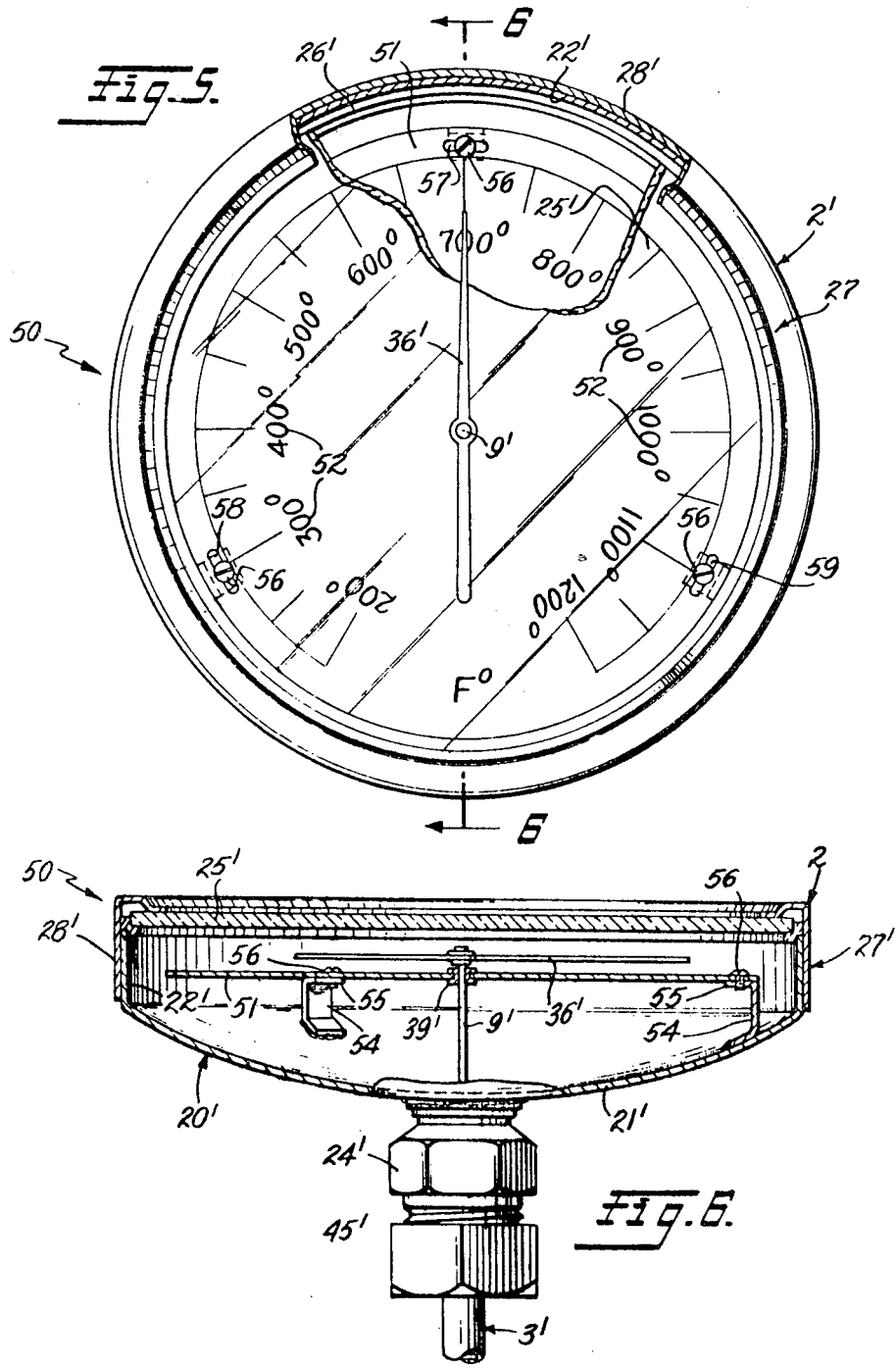

3,623,370
HIGH TEMPERATURE BIMETAL THERMOMETER
Robert E. Busch, Elizabeth, Robert W. Freeman, West Orange, and Robert T. Luedeman, Metuchen, N.J., assignors to Weston Instruments, Inc., Newark, N.J.
Continuation of application Ser. No. 725,367, Apr. 30, 1968. This application Jan. 27, 1970, Ser. No. 6,230
Int. Cl. G01k 5/64, 15/00
U.S. Cl. 73—363.9
22 Claims

ABSTRACT OF THE DISCLOSURE

A high temperature thermometer employing a bimetallic temperature sensing element adjacent one end of a sealed housing. An oxygen getter is located adjacent the bimetal element that removes from the atmosphere within said sealed housing trace amounts of oxygen. An indicator is within said sealed housing remote from the bimetallic element and a temperature scale is secured to said housing adjacent said indicator. A force transmitter is connected between the bimetallic element and said indicator to move said indicator in response to thermal expansion of said bimetallic element.

---

This application is a continuation of our copending U.S. patent application Ser. No. 725,367, filed Apr. 30, 1968, now abandoned, for High Temperature Bimetal Thermometer.

This invention relates to a high temperature thermometer of the type utilizing a bimetallic temperature sensing element and to a method of manufacture which provides an extremely accurate and reliable high temperature bi-metal thermometer.

More specifically, the invention relates to a bi-metal thermometer capable of accurately measuring temperatures in a range as high as 1100°–1200° F., and in which the accuracy of the thermometer is not affected adversely by accidental or unintentional exposure of the thermometer to temperatures substantially above the calibrated operating temperature of the thermometer.

More specifically, the invention relates to a high temperature thermometer having a bimetallic sensing element of the helically wound type, and a temperature indicator spaced from the bimetallic element and connected thereto by a rod or wire which transmits torsional forces from the bimetallic element to the indicator, and in which at least the bimetallic element is enclosed in a sealed housing containing an atmosphere completely free from fluids which can react with the bimetallic element.

A distinct advantage of the bimetallic element thermometer over other temperature measuring devices is its simplicity and low cost. While temperature measuring instruments of the thermocouple type and the resistance type can in some instances, accurately measure temperatures above 1200° F., the indicating instruments used with these temperature sensing elements are quite expensive, cumbersome, and easily damaged. In addition, inadvertently exposing the temperature sensing elements of the thermocouple and resistance type temperature measuring devices can readily damage the sensing elements as well as the indicating instruments.

While attempts have been made to provide an accurate high temperature thermometer with a bimetallic temperature sensing element, such prior attempts have been far from successful, especially where the thermometer must operate with consistent accuracy over a broad temperature range with a high upper limit, for example 200°–1200° F.

While it is not known with certainty why prior attempts to provide a thermometer with a bimetallic temperature sensing element have failed in the past, it is believed that these prior attempts were unsuccessful because of minute quantities of oxygen remaining within the sealed thermometer housing after assembly, or which entered the housing during calibration of the thermometer. Such minute quantities are on the order of 1% or less and evidently react with and change the operating characteristics of the bimetal in an unpredictable manner with the result that a special scale must be constructed for each thermometer that is produced. With applicant's thermometer, and as a result of its mode of manufacture, the oxygen content of whatever inert gas is used in the housing is maintained at substantially an absolute zero level so that absolutely no deterioration of the bimetal element can occur at the high operating ranges of the thermometer.

Such complete elimination from within the housing of all oxygen and other fluids, which many react with the bimetal element, is accomplished by incorporating an oxygen getter material within the housing at a location closely adjacent the temperature sensitive bimetallic element. Thus, even trace amounts of oxygen remaining after thorough purging of the housing will be consumed by the oxygen getter before these trace amounts can change the characteristics of the bimetallic element. Although all precautions are taken to avoid contamination of the atmosphere within the housing of the thermometer, it has been found that it is virtually impossible to obtain a sufficiently pure atmosphere within the housing by the usual procedures of purging without also using the oxygen getter, or other material to eliminate gases which react with the bi-metallic element.

As will subsequently be described in detail, the oxygen getter is advantageously tantalum which does not become active as an oxygen getter until its temperature is increased to approximately 1000°. The temperature at which the oxygen getter becomes active, however, is advantageously below the temperature at which the oxygen can adversely affect the bimetal.

By the innovation of applicant's development, an accurate thermometer using a bimetallic temperature senssing element is provided. The thermometer performs accurately at temperatures as high as 1200° F., and, in addition, it is relatively easy to manufacture and to calibrate when necessary, and correspondingly, a low reject rate is maintained as a result of applicant's unique thermometer and its mode of manufacture.

In view of the foregoing it is correspondingly an object of this invention to provide a high temperature thermometer of the type utilizing a bimetallic temperature sensing element.

Another object is a unique method of manufacturing a high temperature thermometer of the type having a bi-metallic temperature sensing element.

A further object is a high temperature bimetallic thermometer in which the bimetallic element is enclosed within a protective housing and the housing contains an atmosphere completely free from gases or fluids which react with the bimetallic element.

A further object is a bimetallic thermometer in which the bimetallic strip is located within a sealed housing having a substantially completely oxygen free atmosphere therein.

A further object is a unique bimetal thermometer arranged to be calibrated without the need for opening the sealed housing of the thermometer to perform the calibration.

A further object is a unique method of calibrating the thermometer, after assembly, to prevent contamination of the bimetal temperature sensitive element after this element is annealed, to provide a substantially stress free bimetal with predictable operating characteristics.

Another and still further object is a method of making a bimetal high temperature thermometer in which trace amounts of oxygen are removed from the atmosphere within the thermometer housing by locating an oxygen getter material adjacent the bimetal element and then heating the thermometer to a temperature sufficiently high that the oxygen getter removes these trace amounts of the oxygen.

Numerous objects and advantages will become apparent with reference to the drawings which form a part of this specification and in which:

FIG. 2 is a partial sectional view taken along line 2—2 of FIG. 1;

FIG. 3 is an enlarged view in section taken along the lines 3—3 of FIG. 2 and showing the stem portion of the thermometer housing;

FIG. 4 is a sectional view taken along lines 4—4 showing numerals formed on the underside of the scale plate of the thermometer;

FIG. 5 is a top plan view of a second embodiment of the thermometer of this invention with portions thereof cut away to facilitate description;

FIG. 6 is a sectional view taken along lines 6—6 of FIG. 5; and

FIG. 7 is a block diagram showing the method of making and calibrating the first and second embodiments of the thermometer of this invention.

Figure 1:
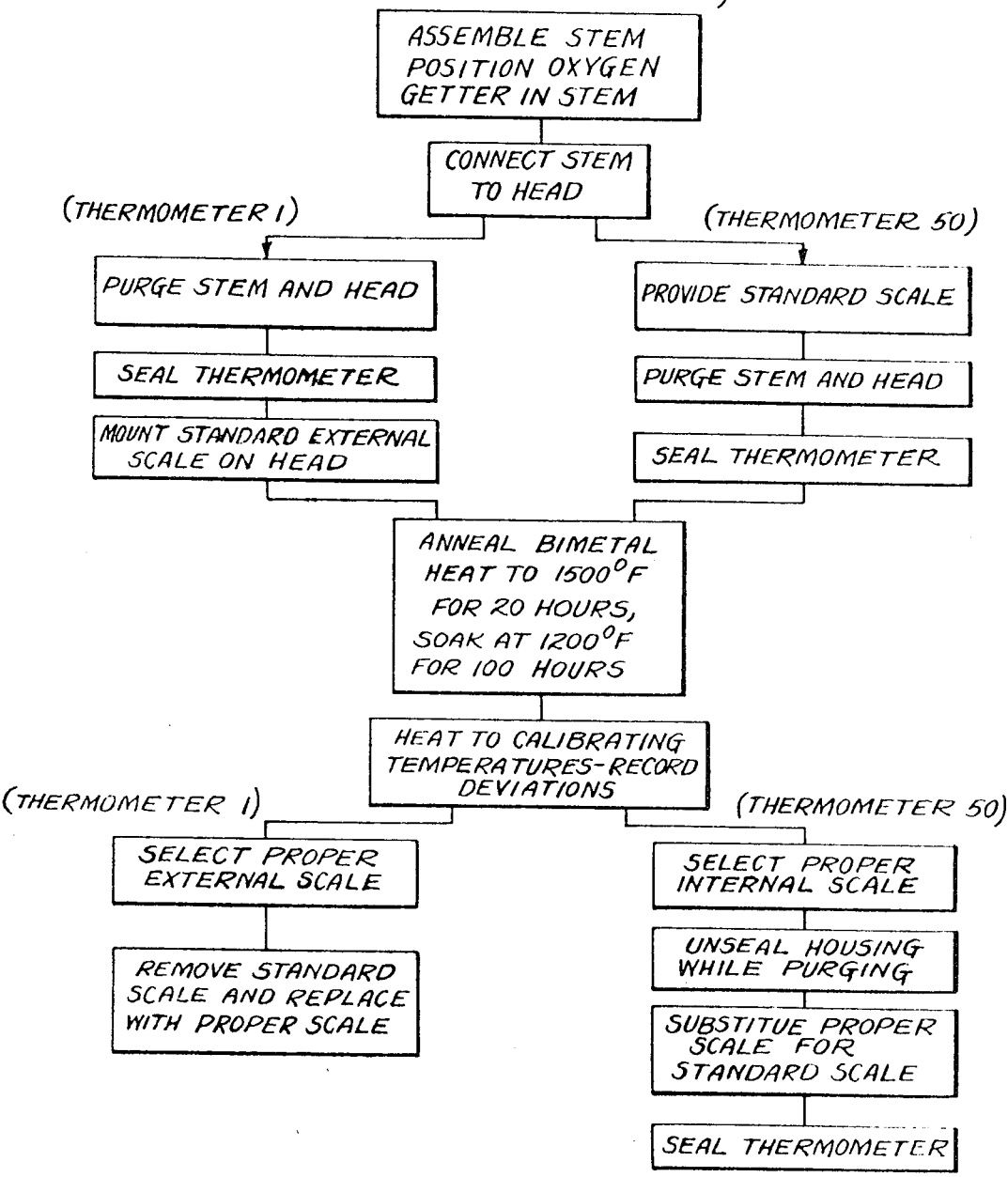
FIG. 1 is a top plan view of a first embodiment of the thermometer of this invention with portions thereof cut away to facilitate description.

Referring now to the drawings in detail and particularly to FIGS. 1–4, there is shown a first embodiment of the thermometer of this invention. The thermometer 1 includes a head assembly 2 and a stem assembly 3. As shown in FIGS. 2 and 3, stem assembly 3 includes an elongated tubular stem 4 with its lower end closed by a plug 5. Positioned within stem 4 is a helically wound bimetallic element 6 having its lower end 7 secured to plug 5 by welding the end of the bimetallic element to the inner end of the plug. The upper end 8 of the bimetallic element is welded to a staff 9 which is sufficiently elongated to extend into head assembly 2.

A plurality of staff guides 10–12 are located within stem 4 in spaced apart relation to each other axially of the stem. Each of guides 10–12 is formed from high temperature resistant metal, such as stainless steel, and is provided with a central opening through which staff 9 extends. Each staff guide has a plurality of axially extending slots 13 formed in the periphery of the guide to provide passages for the flow of purging gas during manufacture of the thermometer.

Located within stem 4 between guide 10, which is closely adjacent upper end 8 of the bimetallic element, and guide 11 which is spaced from the above guide 10 is a helically coiled ribbon 14 of tantalum. The tantalum ribbon 14 is supported between guides 10 and 11 so it does not touch the portion of staff 9 which extends through the center of the coiled ribbon. Guides 10–12 are advantageously secured in their predetermined spaced apart relation axially of stem 4 by a refractory cement 15 which secures the guides to the inner wall of the stem.

Closure plug 5 has a body portion 16 of a diameter to be a snug press fit in the lower end of stem 4. A bottom flange 17 of the plug provides a stop shoulder which permits precise axial positioning of plug 5 within the stem, after which the plug is welded or brazed to seal the lower end of the stem. Plug 5 has an internally threaded bore 18 which is closed by a removable threaded plug 19. Plug 19 is advantageously removable to permit purging stem 4 during manufacture of the thermometer, in a manner which will subsequently be described in detail.

Head assembly 2 includes a shallow cup shaped casing 20 with a curved bottom wall 21 and an upright relatively low side wall 22. Bottom wall 21 is provided with a central opening 23 and a compression fitting 24 is secured to the bottom wall in alignment with opening 23. The compression fitting is advantageously secured and sealed to bottom wall 21 by welding or brazing and projects outwardly away from the bottom wall.

The open upper end of side wall 21 is closed by a transparent cover plate 25 which seats on a ring-shaped gasket 26 that maintains a hermetic seal between the glass face plate and the upper end of side wall 22. Cover plate 25 is secured to casing 20 by a closure ring 27. Ring 27 has a side wall 28 dimensioned to be forced fitted onto side wall 22, and has an inwardly extending flange 29 which engages the flat outer face of cover plate 25 adjacent its periphery to hold the plate in position with gasket 26 compressed.

Removably secured to casing 20 by a retaining ring 30 is a transparent scale plate 31. Scale plate 31 has a circular outline of a dimension to lie flat against the outer surface 32 of cover plate 25 and within flange 29 of ring 27. Retaining ring 30 has a side wall 33 which is a sliding fit with the outer surface of side wall 28 of ring 27, and the retaining ring extends inwardly, and then downwardly to terminate at an annular edge 34 which engages the face of scale plate 31 to hold the scale plate in position on cover plate 25. A set screw 35 extends through side wall 33 to permit securing ring 30, and correspondingly scale plate 31 in any desired angular position relative to casing 20.

As shown at FIG. 2, staff 9 extends a substantial distance into casing 20 and terminates just below cover plate 25. A pointer 36 is press fitted to the end of staff 9 so that the pointer rotates with the staff. Immediately beneath pointer 36 is a mirror 37 which is secured to casing 20 by a plurality of mounting lugs 38 which are secured to the bottom wall 21 of the casing by welding. Mirror 37 has a central opening aligned with the axis of staff 9, and a guide bushing 39 is fitted into the opening to support the portion of staff 9 immediately adjacent pointer 36.

As shown at FIG. 4, indicia 41 including numerals 42 are advantageously printed, etched, or otherwise formed on that surface of scale plate 31 which engages cover plate 25 Thus, the indicia and numerals are protected from wear and abrasion during normal use of thermometer 1 As shown at FIG 1, the temperature scale of the thermometer is 200° to 1200° F With reference to FIG. 3, it will be observed that bore 43 of compression fitting 24 is slightly larger than the diameter of opening 23. Hence, the metal of bottom wall 21 adjacent opening 23 acts as a stop against which the end 44 of stem 4 abuts when the stem is inserted into the compression fitting. When the stem is fully inserted into compression fitting 24 with its end in engagement with bottom wall 21, the stem is secured and sealed to head assembly 2 by tightening compression nut 45.

As previously explained, scale plate 31 is releasably connected to the thermometer by ring 30. However, when a scale is located even a slight distance from pointer 36, the scale is difficult to read accurately. Hence, the mirror 37 is provided and has its reflective surface facing toward pointer 36. This allows one using the thermometer to change the position of his eye relating to the thermometer so that the pointer and its image coincide, whereupon a very accurate reading can be taken. Without the mirror, it is conceivable that one reading the thermometer will view the thermometer at an angle to the axis of stem 4, which will of course result in an inaccurate reading.

Referring now to FIGS. 5 and 6, a second embodiment of the thermometer of this invention will be described. As shown at FIGS. 5 and 6, a thermometer 50 is quite similar to the thermometer 1 of FIGS. 1–4. Thus, thermometer 50 has a stem assembly 3' identical to stem assembly 3 of the thermometer 1 previously described. In addition, there is a head assembly 2' which differs somewhat from the head assembly of thermometer 1. This head assembly has a casing 20' with curved bottom wall 21' and short side wall 22'. A compression fitting 24' extends downwardly from bottom wall 21' in the same manner as described for compression fitting 24 of the thermometer 1. A transparent cover plate 25' seats on a gasket 26' and seals the upper end of side wall 22'. A cover plate is held in place by securing ring 27' which has a depending side wall 28' that is a press fit onto side wall 22' of casing 20'. Staff 9' extends from stem 3' into casing 20' and terminates just below cover plate 25'. Pointer 36' is press fitted onto the end of staff 9'.

The only significant difference between thermometer 1 of FIGS. 1–4 and thermometer 50 of FIGS. 5 and 6 is that the scale plate 51 of thermometer 50 is located within casing 20' at a location immediately beneath pointer 36'. Correspondingly, a scale plate like external scale plate 31 is not required with thermometer 50.

Scale plate 51 takes the form of a disc of thin sheet metal with indicia and numerals 52 printed or etched on the surface of the plate which faces toward cover plate 25'. Mounted in the opening at the center of scale plate 51 is a guide bushing 39' which supports the upper end of staff 9' at a location closely adjacent pointer 36.

Secured to bottom wall 21' are three equally circumferentially spaced lugs 54. Lugs 54 are generally C-shaped and have a top leg 55 which engages the surface of scale plate 51 faces toward bottom wall 21'. Each leg 55 has a threaded opening formed therein to receive a screw 56 to mount the plate within casing 20'. Provided in scale plate 51, in equally spaced circumferential relation to each other, are three circumferentially elongated slots 57–59 which are at the same radial distance from the center of the thermometer as the threaded openings in lugs 55. Thus, scale plate 51 can be positioned on the lugs, screws 56 can then be loosely inserted and scale plate 51 can be rotated relative to casing 20' and pointer 36', within the predetermined limits determined by the circumferential length of slots 57–59. Hence, scale plate 51 can be adjusted circumferentially relative to pointer 36' to precisely position the proper indicia of the scale plate with the pointer and thus obtain a "zero adjustment."

It will be noticed with reference to FIGS. 5 and 6 that casing 20', cover plate 25', seal ring 27' and gasket 26' cooperate with stem 4' (which has its lower end sealed by a plug like plug 5 of FIG. 3), to form a housing for the several parts of thermometer 50. While the details of stem assembly 3' are not shown in the embodiment of FIGS. 5 and 6, it is to be understood that this stem assembly includes a staff 9; staff guides 10–12, a tantalum ribbon 14 and a bimetallic element 6 all identical to those shown and described previously for thermometer 1.

With reference to the thermometer 1 of FIGS. 1–4, casing 20, cover plate 25, seal ring 27 and gasket 24 cooperate with stem 4 that has its lower end sealed by plug 5, to form a sealed housing for the thermometer.

The bimetallic temperature sensing element 6 which is used in both thermometer 1 and thermometer 50 is advantageously a helically wound ribbon of two metals of different thermal expansion characteristics bonded or otherwise secured together. The ribbon from which the temperature sensitive bimetallic element 6 is formed for both thermometer 1 and thermometer 50 is available from Texas Instruments Company, Texas, under the name of G–7 bimetal. This bimetal has the following characteristics:

High expansion side—T 18–8 stainless iron (18% nickel 11.5% chromium balance iron).

Low expansion side—430 stainless iron (17% chromium 83% iron).

Cross-section—.010" thick by .040" wide.

The tantalum ribbon 14 is relatively thin to provide a large surface area and is wound helically so that a large area of the tantalum is available to react with any oxygen within the housing at a location immediately adjacent the bimetallic element 6.

ASSEMBLY AND MANUFACTURING OF THERMOMETER 1 (FIGS. 1–4)

To assemble thermometer 1, a predetermined length of bimetallic element 6 is selected, one end of the bimetallic element is welded to plug 5, and staff 9 is welded to the other end of the bimetallic element. Next, guides 11 and 12 are within stem 4 and are cemented to the inner wall of the stem as previously described. Then, tantalum ribbon 14 is inserted in stem 4 and staff guide 10 is next inserted and cemented in position. Next, staff 9 is threaded through the openings in staff guide 10–12 so bimetallic element 6 is positioned as shown at FIG. 3 and plug 5 is seated in the end of stem 4. The joint between stem 4 and plug 5 is sealed by welding of brazing as at 60.

Next, flat mirror 37 is secured in casing 20 in parallel relation to the top edge of the casing, by welding lugs 38 to bottom wall 21 of the casing. Then, the upper end of stem assembly 3 is slipped into compression fitting 24 and the compression nut 45 is tightened to fix and seal the stem to the casing. As stem 4 is inserted in compression fitting 24 the end of staff 9 is guided through guide bushing 39.

Then, pointer 36 is fixed to the upper end of staff 9 by pressing the pointer onto the staff, so it rotates with the staff in a plane parallel to mirror 37. Gasket 26 and cover plate 25 are then loosely positioned on casing 20. Next, plug 18 is loosened and stem 4 is inserted in a retort. Inert gas under pressure is then forced through the retort and thus through the stem and casing 20 and is allowed to exit through the loose seal between the cover plate and the casing. After the inert gas has purged the stem and casing, securing ring 27 is pressed onto casing 20 to seal the casing. Then, plug 19 is tightened. Next, a standard outside transparent scale plate 31 (which measures 300 mechanical degrees between the 200° F. and 1200° F. scale marks) is positioned on cover plate 25 and retaining ring 30 is slipped onto ring 27 and secured by tightening set screw 35. The scale plate 31 is parallel to mirror 37 when it is seated.

Then, the thermometer is placed in an oven and is heated from at least 1500° F. to as high as 1800° F., a temperature range somewhat higher than the maximum 1200° operating temperature of the thermometer. The thermometer is maintained at 1500° for a length of time sufficient to anneal (i.e., completely stress relieve) the bimetallic element 6 as well as the other parts of the stem assembly. During such heating to 1500°, any trace amounts of oxygen which may have been absorbed on the surfaces of any of the parts of the thermometer, which may not have been expelled during the purging operation, or which may have been present in the 99.999% pure inert gas used for purging react with the tantalum oxygen getter before this oxygen reacts with the bimetallic element and changes its operating characteristics. Since tantalum becomes active as an oxygen getter at a temperature of approximately 1000° F., it is believed that trace amounts of the oxygen are consumed by the tantalum before the bimetallic element reaches a temperature at which the oxygen adversely affects the characteristics of the bimetal.

Then, the temperature of the thermometer is reduced to 1200° and this temperature is maintained for 100 hours during which indicator 36 is closely observed. If the indicator drifts while the thermometer is maintained at 1200° the unit is defective and is rejected. If there is no drift, the position of the pointer 36 relative to the 1200° mark of the scale is noted and recorded. Next, the temperature of the thermometer is reduced, for example, to 700° and the relative position of the pointer 36 to the 700° mark is again noted and recorded. Then, the temperature is further reduced, for example, to 200° and the position of the pointer relative to the 200° mark is noted and recorded.

In the preferred embodiment of thermometer, the angular deflection of the pointer 36 between 200° F. and 1200° F. is 300 mechanical degrees. It has been found however that deviations of 2 or 3 mechanical degrees above or below the preferred 300 mechanical degrees are permissible and an accurate thermometer can still be obtained by replacing the standard scale plate 31 (which measures 300 mechanical degrees between 200° F. and 1200° F.) with a selected scale that measures precisely the same number of mechanical degrees as the angular displacement of pointer 36 from 200° F. to 1200° F. Thus, if the observed deflection of pointer 36 from 200° F. and 1200° F., is, for example, 302 mechanical degrees, a scale in which the 200° F. mark and the 1200° F. mark are 302 mechanical degrees apart will be used with the thermometer. After the proper scale is selected and positioned on the thermometer, the thermometer is heated to a predetermined temperature, for example, 500° F., and the scale plate is adjusted so that the mark on the plate corresponding to 500° F. is aligned with the pointer whereupon, the scale plate is secured to the thermometer in its "zeroes" position by tightening set screw 35 on retaining ring 30. Since scale plate 31 is outside the sealed housing it is not necessary to unseal the housing to calibrate thermometer 1.

METHOD OF MAKING THERMOMETER 50 (FIGS. 5 AND 6)

Stem assembly 3' is first assembled in the manner described for stem assembly 3 of thermometer 1, and assembly 3' is identical to assembly 3. Next, standard scale plate 51 is secured to the casing 20' by screws 56. Then, stem assembly 3' is inserted into compression fitting 24' and staff 9' is guided through bushing 39'. Next, compression nut 45' is tightened to seal the stem to the casing. Then, pointer 36' is press fitted onto the end of staff 9'. Cover plate 25' and gasket 26' are then loosely positioned on casing 20' and the housing is purged with inert gas in the manner described for thermometer 1. After purging, securing ring 27' is pressed onto the casing to seal the casing. Cover plate 25', scale 51 and pointer 36' are parallel with each other. Then, the thermometer is heat treated at 1500° F. for several hours and is "soaked" for many hours at 1200° F. Then, the temperature of the thermometer 50 is lowered in steps to determine its accuracy and to obtain data for calibration.

To calibrate thermometer 50, it is necessary to remove securing ring 27', cover plate 25' and then remove pointer 36' and scale 51. Then, scale 51 is replaced with a scale of the proper mechanical deflection to correspond with that of pointer 36'. Before opening the housing by removing cover plate 25, plug 19 at the bottom of stem 4 is loosened, and the stem is placed in a retort through which inert gas flows at low pressure. Thus, when cover plate 25 is removed, the inert gas flowing through the stem prevents air from flowing into the stem or casing. After the properly calibrated scale 51 is inserted in casing 20', cover plate 25' is again loosely placed over the casing to allow the inert gas to completely displace any air which may have entered casing 20' when cover plate 25 was removed. Then, securing ring 27 is again pressed onto the casing and plug 19 is tightened to seal the casing. It has been found that even though trace amounts of oxygen may be present in the thermometer housing after calibration, the tantalum oxygen getter reacts with and consumes the oxygen before the oxygen reacts with the bimetallic element and changes its operating characteristics. Thus, the accuracy and reliability of this high temperature bimetallic thermometer is attributable primarily to the oxygen getter which assures that substanially no oxygen at all reacts with the bimetallic element at the high temperature to which the element is subjected during annealing temperature sensing within its range of operation.

Example 1

Thermometer 1 was assembled as described above, using a G–7 bimetal as the bimetallic element 6 and a tantalum ribbon 14 as the oxygen getter. Cover plate 25 was loosely positioned on the end of the casing. Plug 19 was loosened and stem 4 was connected to a cylinder of 99.999% pure argon. The argon was flowed through the stem and casing to purge the thermometer housing and exited at the loosely seated cover plate 25. Securing ring 27 was pressed on the casing to seal the cover plate to the casing, and plug 19 was tightened. Then, a standard scale 31 (300 mechanical degrees between 200° F. and 1200° F.) was positioned on the cover plate and retaining ring 30 was installed to hold the scale plate in position.

The thermometer was placed in an oven and heated to 1500° F. and was maintained at 1500° F. for 20 hours. The temperature of the oven was lowered to 1200° F. and this temperature was maintained for 100 hours. The thermometer was observed periodically at the 1200° F. temperature and no drift of the pointer was noticed. The position of the pointer relative to the 1200° F. mark of the standard scale plate was noted and recorded. The temperature in the oven was reduced to 700° F. (mid-scale) and the position of the pointer was noted and recorded. The temperature was reduced to 200° F. and the position of the pointer was noted and recorded. At 1200° F. the pointer was two mechanical degrees below the 1200° F. mark on the standard scale. At 700° F. the pointer was aligned with the 700° F. mark on the pointer scale. At 200° F. the pointer was 2 mechanical degrees above the 200° F. mark on the standard scale. A new scale plate 31 was selected with 296 mechanical degrees between the 200° F. mark and the 1200° F. mark. The standard scale was replaced with the 296° mechanical scale and the thermometer was tested at 200° F., 700° F. and 1200° F. The pointer aligned with the respective temperature scale marks at each temperature.

The thermometer was disassembled and the bimetal and tantalum were inspected. The surfaces of the bimetal were clean and free of any oxidation. The tantalum had a whitish appearance indicating that it reacted with some residual oxygen remaining in the thermometer housing after it was purged and sealed.

Example 2

Thermometer 1 was assembled as explained in Example 1 except that the tantalum oxygen getter was not used. The thermometer was purged with 99.999% pure argon and the housing was sealed. The thermometer was maintained at 1500° F. for 20 hours and the temperature was then reduced to 1200° F. for 100 hours. The pointer drifted considerably at 1200° F. and the thermometer could not be calibrated within a range of deviation of +4, −4 mechanical degrees deviation.

The thermometer was allowed to cool and was disassembled. The bimetallic element showed considerable surface scale indicating oxygen corrosion.

Example 3

Thermometer 1 was assembled as explained in Example 1 using a G–7 bimetal and a tantalum oxygen getter. Plug 19 was removed and cover plate 25 was loosely placed on the casing. The thermometer was placed in a chamber, a high vacuum was drawn on the chamber, and the chamber was then filled with 99.999% pure argon. The thermometer housing was sealed while the thermometer was within the closed chamber. The thermometer was removed from the chamber and heated to the several temperatures of Example 1. The pointer had a deflection of 300 mechanical degrees between 200° F. and 1200° F., and no calibration was necessary. However, it was necessary to angularly adjust standard scale plate 31 to zero the thermometer. The thermometer performed accurately at 200° F., 700° F. and 1200° F.

The thermometer was disassembled and the bimetal and tantalum were inspected. The bimetal showed no surface corrosion but the tantalum had a whitish appearance, which indicated reaction with residual oxygen in the housing.

While it is not precisely known where the oxygen comes from which reacts with the tantalum during the annealing and soaking of the thermometer, it is believed that either some oxygen is absorbed onto the surfaces of the various internal parts of the thermometer, particularly in crevices where purging is not 100% effective and that the very slight amount of oxygen, less than .001%, which may be present in the 99.999% pure argon may account for the trace amounts of oxygen in the housing which react with the tantalum.

Example 4

Thermometer 50 was assembled using a G–7 bimetal and a tantalum oxygen getter 14. A standard scale 51 was positioned in casing 20' and pointer 36' was then pressed onto staff 9. Plug 19 was removed and cover plate 25' was loosely seated on the end of casing 20'. The stem and casing were then purged with 99.999% pure argon from a cylinder by flowing the argon through the stem and out of the thermometer housing at the loose fit between cover plate 25' and casing 20'. The cover plate was then sealed to the casing and plug 19 was tightened.

Thermometer 50 was then heated to the temperatures of Example 1. There was no drift of the pointer at 1200° F. The recorded data showed that the pointer was two mechanical degrees above the 1200° mark of standard scale 51, was two mechanical degrees above the 700° mark and was 2 mechanical degrees above the 200° scale mark.

The thermometer was placed in a chamber filled with inert gas, and the chamber was purged to assure the absence of residual oxygen. Cover plate 25 was removed and scale 51 was adjusted two mechanical degrees to correspond to the deviation of the pointer from the scale mark at the 200° F., 700° F. and 1200° F. temperatures. Cover plate 25' was replaced to seal that thermometer housing. The thermometer was then tested at 200°, 700° and 1200° and was found to be accurate.

The thermometer was disassembled and the bimetal and tantalum were inspected. The bimetal showed no surface corrosion or discoloration whereas the tantalum again had a whitish appearance indicating a reaction with residual or trace amounts of oxygen during annealing and testing.

Example 5

The procedure of Example 4 was repeated using a G–7 bimetal but without the tantalum oxygen getter. All heating to anneal the bimetal and to calibrate the thermometer was exactly the same as in Example 4. The thermometer performed erratically and could not be calibrated. Several mechanical degrees of deviation were noted when the thermometer was heated to 700° cooled and then reheated to 700°.

The thermometer was disassembled and the bimetal was inspected. The surface of the bimetal was stained and exhibited some scale indicating a reaction with oxygen.

Example 6

The thermometer 50 was assembled as in Example 4 using a G–7 bimetal and a tantalum oxygen getter. The thermometer housing was purged differently. Cover plate 25' was loosely seated on the end of the casing 20' and plug 19 was loosened. Stem 4 was placed in a retort communicating with a cylinder of 99.999% pure argon. The argon was flowed through the stem and casing and cover plate 25' was then sealed to the casing. Plug 19 was then tightened before removing the stem from the retort.

The thermometer was then heated to the several temperatures of Example 1; there was no drift at 1200° F., but a 302 degree mechanical scale was necessary to calibrate the thermometer. The stem of the thermometer was placed in the argon filled retort and plug 19 was loosened. A positive pressure of argon was retained in the retort and the cover plate 25' was removed. Pointer 36' was then removed and standard scale 51 was replaced with a 302° mechanical scale. The cover plate was loosely replaced onto the casing and argon was allowed to flow through the casing. The cover plate was then sealed to the casing and the thermometer was tested. The test included heating the thermometer to 1500° F. for a short period of time and then testing at 200° F., 700° F. and 1200° F. The thermometer performed accurately and reliably during the test. The thermometer was then disassembled and the bimetal and tantalum inspected. The G–7 bimetal showed no surface discoloration or corrosion. The tantalum however has a distinct whitish color indicating that more oxygen reacted with the tantalum then in the test results of Example 4. It was therefore concluded that some air was present in the thermometer housing after either the first or second purging operation.

The tests of Examples 1–6 show that an accurate bimetal thermometer for operation at 1200° F. cannot be obtained commercially without the use of the oxygen getter. A distinct advantage of the tantalum oxygen getter is that it does not react with oxygen at room temperatures or at the 200° F., 500° F. temperatures at which it is sometimes necessary to zero the thermometer, and which may be done when the housing is open. Thus, the tantalum can be handled at ambient temperatures without any special equipment or facilities to maintain a protective atmosphere around the tantalum.

It is to be appreciated that thermometer 1 can be mass produced if, say 98% of the thermometers made have a scale deflection of between 298 and 304 mechanical degrees between 200° F. and 1200° F. Thus, only eight different scale plates are required. However, if the thermometers have greater deviations from the 300 mechanical degree standard, say 285 to 315 mechanical degrees, than thirty scale plates are required and the process of calibration becomes too expensive for commercial production of the thermometer in quantity. It has been found that both thermometer 1 and thermometer 50, manufactured as described herein, exhibit a scale deflection within the permissible +4, −4, mechanical degree deviation from the standard scale, and very few rejects are obtained.

While two preferred embodiments of the preferred embodiment of the thermometer of this invention, and several methods of manufacturing the thermometer of this invention are shown and described herein, it is within the contemplated scope of this invention that numerous changes can be made in both the preferred embodiments of the thermometer and the manufacturing steps without departing from the contemplated scope of this invention.

What is claimed is:

1. In a method for manufacturing a high temperature thermometer of the type employing a bimetallic temperature sensing element, the steps comprising:
   providing a bimetallic temperature sensitive element;
   positioning said bimetallic element within a thermometer housing,
   positioning an oxygen getter within said housing at a location closely adacent the bimetallic element
   annealing said bimetallic element after said oxygen getter and bimetallic element are positioned in the housing while maintaining an atmosphere within the housing which is substantially non-reactive with the bimetallic element, said annealing including heating at least said bimetallic element to a temperature at least as high as the maximum operating temperature of thermometer calibrating the thermometer while maintaining an atmosphere within the housing which is substantially non-reactive with the bimetallic element; and sealing the housing.

2. A method according to claim 1 wherein:

said step of sealing the housing is performed prior to annealing and calibrating the thermometer; and which further includes:

filling said housing with an atmosphere that is substantially non-reactive with the bimetallic element before sealing the housing;

whereby, the non-reactive atmosphere is maintained within the housing during annealing and calibrating.

3. A method according to claim 1 wherein:

said step of sealing the housing is performed prior to annealing the bimetallic element; and which further includes:

filling said housing with an atmosphere that is substantially non-reactive with the bimetallic element before sealing the housing, opening the housing after annealing to calibrate the thermometer, and sealing the housing after calibrating the thermometer.

4. A method according to claim 1 wherein:

the thermometer is intended to accurately measure temperature over 1000° F;

said step of providing a bimetallic element includes providing a bimetallic temperature sensitive element comprised of:

a first strip of stainless iron, and a second strip of stainless iron secured to the first strip and having thermal expansion characteristics different from said first strip; and said step of annealing includes heating the bimetallic element to a temperature above 1200° F.

5. A method according to claim 1 wherein:

said step of positioning an oxygen getter within the housing includes:

positioning tantalum adjacent the bimetallic element.

6. A method according to claim 5 wherein:

said step of annealing includes:

heating said bimetallic element to at least 1500° F. for several hours;

and which further includes:

reducing the temperature from said at least 1500° F. to approximately 1200° F. for several hours to determine the operating stability of the thermometer.

7. A method of manufacturing a high temperature thermometer of the type utilizing a temperature sensitive bimetallic element comprising the steps of:

providing a bimetallic temperature sensitive element;

providing indicator means;

connecting motion transmitting means between said bimetallic element and said indicator means;

positioning said bimetallic element, indicator means and motion transmitting means in a housing;

positioning an oxygen getter in said housing at a location adjacent the bimetallic element;

purging said housing with an inert gas;

sealing said housing;

annealing said bimetallic element after the housing is sealed by heating the bimetallic element to a temperature above its anticipated range of operation;

unsealing said housing and calibrating the thermometer while maintaining an inert atmosphere within at least the portion of the housing where the bimetallic element is located.

8. A method according to claim 7 wherein:

said step of calibrating the thermometer includes:

heating said bimetallic element to several different temperatures within the temperature sensing range of the thermometer, observing the deflection of said indicator means at each of said temperatures, selecting a scale which corresponds with the operating characteristics of the thermometer, and securing said scale to said housing.

9. A method according to claim 8 wherein:

said step of securing the scale to the housing includes:

opening said housing, positioning said scale in said housing adjacent said indicator means, and sealing said housing while maintaining an inert atmosphere within the housing.

10. A method according to claim 8 wherein:

said step of securing the scale to the housing includes:

mounting said scale on the outside of said housing for adjustment relative to said indicator means.

11. A method of manufacturing a high temperature thermometer of the type having a bimetallic temperature sensitive element comprising the steps of:

providing a helically wound bimetallic temperature sensitive element;

providing a pointer;

connecting rotary motion transmitting means between one end of said bimetal and said pointer;

providing a housing;

positioning said bimetallic element and motion transmitting means within the housing;

securing the other end of the bimetallic element to the housing;

positioning an oxygen getter in said housing at a location adjacent the bimetallic element;

positioning a scale within the housing adjacent said pointer;

introducing an inert gas into said housing;

sealing said housing while maintaining said housing substantially filled with the inert gas;

annealing said bimetallic element by heating said housing after the housing is sealed;

said annealing including heating the bimetallic element to a temperature above its normal operating range;

calibrating said thermometer by:

maintaining said thermometer at several different temperatures for a length of time sufficient to observe the angular position of the pointer at each temperature;

opening said housing, selecting and securing in the housing a scale corresponding to the operating characteristics of the thermometer, and sealing said housing while maintaining the housing filled with an inert gas.

12. A method according to claim 11 wherein:

said step of providing a bimetallic element includes providing an element comprised of:

a first strip of a alloy containing chromium and iron, and a second strip of an alloy of chromium and iron having different thermal expansion characteristics from said first strip and secured to said first strip.

13. A method according to claim 12 wherein:

said first strip is an iron base alloy containing 18% nickel and 11.5% chromium, and said second strip is an iron base alloy containing 17% chromium.

14. A method according to claim 13 wherein:

said oxygen getter maintains the oxygen content of the atmosphere within said housing below .001% at least in the portion of the housing adjacent the bimetallic element.

15. A high temperature thermometer of the type employing a bimetallic temperature sensing element comprising in combination:
a sealed housing;
a bimetallic temperature sensitive element adjacent one end of the housing;
an indicator within said housing at a location remote from said bimetallic element;
a temperature scale secured to said housing adjacent said indicator;
force transmitting means connected between said bimetallic element and said indicator to move said indicator in response to thermal expansion of said bimetallic element; and
a substantially completely oxygen free atmosphere within said housing, said atmosphere containing substantially less than .005% oxygen.

16. A high temperature thermometer according to claim 15 wherein:
said high temperature thermometer is capable of accurately measuring temperatures as high as 1200° F.; and
said bimetallic element includes:
a first piece of iron base alloy, and a second piece of iron base alloy having thermal expansion characteristics different from said first piece.

17. A high temperature thermometer according to claim 16 wherein:
said thermometer further includes:
a strip of tantalum disposed within said housing at a location closely adjacent said bimetallic element.

18. A high temperature thermometer according to claim 17 wherein:
said first piece of iron base alloy comprises:
18% nickel
11.5% chromium
balance iron
said second piece of iron base alloy comprises:
17% chromium
83% iron.

19. A high temperature thermometer according to claim 18 wherein:
said temperature scale is located within said housing and said indicator is positioned between said scale and a viewing window of the housing.

20. A thermometer according to claim 18 wherein:
said temperature scale is outside said scale housing and is mounted on said housing at a location adjacent a viewing window portion of the housing; and which further includes:
means adjustably securing said scale to said housing.

21. A high temperature thermometer according to claim 20 wherein:
the viewing window of the thermometer is substantially flat;
said indicator includes pointer means movable in a plane parallel with the viewing window;
said temperature scale is a flat plate secured to said housing in parallel relation to said viewing window; and
which further includes:
a flat mirror on the opposite side of said indicator means from said viewing window, and
means securing said mirror in parallel relation to said temperature scale.

22. A high temperature thermometer of the type employing a bimetallic temperature sensing element comprising in combination:
a sealed housing;
a bimetallic temperature sensitive element adjacent one end of the housing;
an indicator within said housing at a location remote from said bimetallic element;
a temperature scale secured to said housing adjacent said indicator;
force transmitting means connected between said bimetallic element and said indicator to move said indicator in response to thermal expansion of said bimetallic element; and
a substantially oxygen free gas in said housing inert to said bimetallic element and in contact therewith for preventing degradation of said element to temperatures as high as 1000° F.

References Cited
UNITED STATES PATENTS

| | | | |
|---|---|---|---|
| 2,117,287 | 5/1938 | Bloch | 73—363.9 |
| 2,365,487 | 12/1944 | Murray | 73—363.9 |
| 3,283,581 | 11/1966 | Du Bois et al. | 73—363.9 |
| 3,321,370 | 6/1967 | Oppenheimer | 73—363.9 X |

LOUIS R. PRINCE, Primary Examiner
W. A. HENRY II, Assistant Examiner

U.S. Cl. X.R.
29—405, 407; 73—1 F